United States Patent
Sawai et al.

(10) Patent No.: US 8,339,978 B2
(45) Date of Patent: Dec. 25, 2012

(54) WIRELESS COMMUNICATION APPARATUS AND WIRELESS COMMUNICATION, AND COMPUTER PROGRAM

(75) Inventors: Ryou Sawai, Tokyo (JP); Tomoya Yamaura, Tokyo (JP)

(73) Assignee: Sony Corporation, Tokyo (JP)

(*) Notice: Subject to any disclaimer, the term of this patent is extended or adjusted under 35 U.S.C. 154(b) by 559 days.

(21) Appl. No.: 12/551,773

(22) Filed: Sep. 1, 2009

(65) Prior Publication Data
US 2010/0091673 A1    Apr. 15, 2010

(30) Foreign Application Priority Data

Oct. 14, 2008    (JP) ................................. 2008-264729

(51) Int. Cl.
H04L 12/26    (2006.01)

(52) U.S. Cl. ........ 370/252; 370/230; 370/235; 370/338; 455/522

(58) Field of Classification Search .......... 370/310–311, 370/318, 230, 252, 334; 455/522, 553.1; 375/260, 152, 326; 714/807; 348/461
See application file for complete search history.

(56) References Cited

U.S. PATENT DOCUMENTS

| | | | | |
|---|---|---|---|---|
| 6,005,885 | A * | 12/1999 | Warren et al. | 375/152 |
| 7,668,261 | B2 * | 2/2010 | Paila | 375/326 |
| 7,974,225 | B2 * | 7/2011 | Kasher | 370/310 |
| 7,995,665 | B2 * | 8/2011 | Pare et al. | 375/260 |
| 2002/0142779 | A1 | 10/2002 | Goto et al. | |
| 2006/0280134 | A1 | 12/2006 | Kwon et al. | |
| 2007/0058575 | A1 * | 3/2007 | Kwon et al. | 370/318 |
| 2007/0133473 | A1 * | 6/2007 | Takagi et al. | 370/334 |
| 2007/0232344 | A1 * | 10/2007 | Aoki et al. | 455/522 |
| 2008/0036909 | A1 * | 2/2008 | Paila | 348/461 |
| 2008/0080375 | A1 * | 4/2008 | Haruta | 370/230 |
| 2008/0109711 | A1 * | 5/2008 | Morioka et al. | 714/807 |
| 2010/0069112 | A1 * | 3/2010 | Sun et al. | 455/553.1 |

FOREIGN PATENT DOCUMENTS

| | | |
|---|---|---|
| JP | 2002-300172 | 10/2002 |
| JP | 2006-50526 | 2/2006 |
| JP | 2007-134905 | 5/2007 |
| JP | 2007-150653 | 6/2007 |
| JP | 2008-507234 | 3/2008 |
| WO | WO 2006/120979 A1 | 11/2006 |
| WO | WO 2007/052986 A1 | 5/2007 |

OTHER PUBLICATIONS

U.S. Appl. No. 12/558,727, filed Sep. 14, 2009, Sawai.
Office Action issued Aug. 17, 2010, in Japan Patent Application No. 2008-264729.

* cited by examiner

*Primary Examiner* — Michael Thier
*Assistant Examiner* — Vincelas Louis
(74) *Attorney, Agent, or Firm* — Oblon, Spivak, McClelland, Maier & Neustadt, L.L.P.

(57) ABSTRACT

A wireless communication apparatus includes a reception unit configured to receive packets in multiple formats in which two or more different types of preamble information and intra-header control information are multiplexed, a demodulation and decode unit configured to demodulate and decode the received packets, and a measurement unit configured to measure a sending end time of the reception packets by selectively referring to any one of the intra-header control information on the basis of a transmission mode supported by the demodulation and decode unit.

11 Claims, 10 Drawing Sheets

FIG. 5

| RATE (4 BITS) | | | | R | | | | LENGTH (12 BITS) | | | | | | | | | F | "0" | "0" | "0" | "0" | "0" | "0" |
|---|---|---|---|---|---|---|---|---|---|---|---|---|---|---|---|---|---|---|---|---|---|---|
| R0 | R1 | R2 | R3 | | | | | | | | | | | | | | | | | | | |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

TAIL (6 BITS)

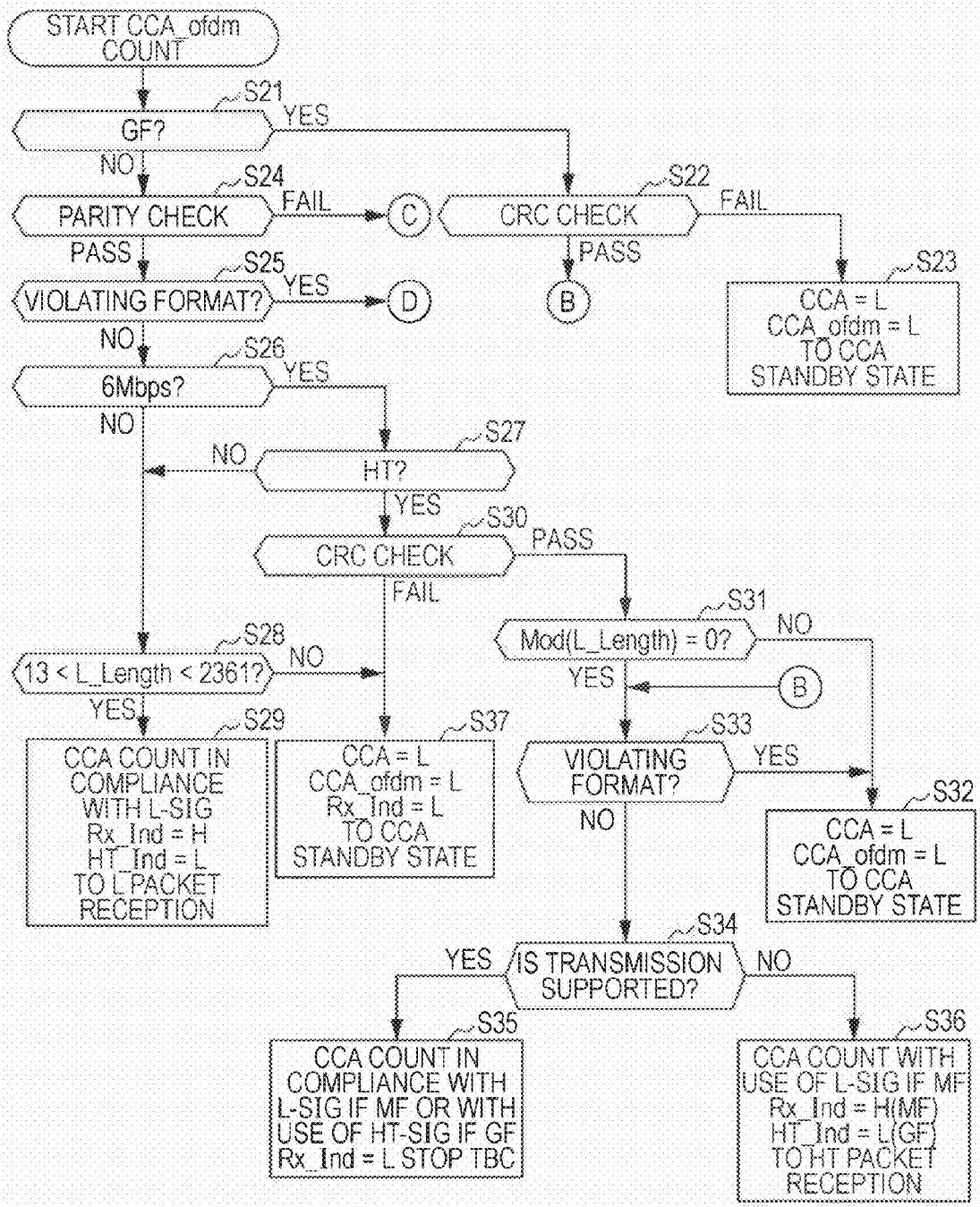

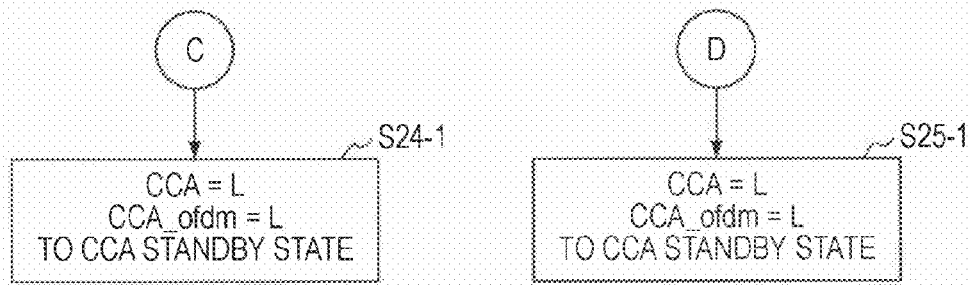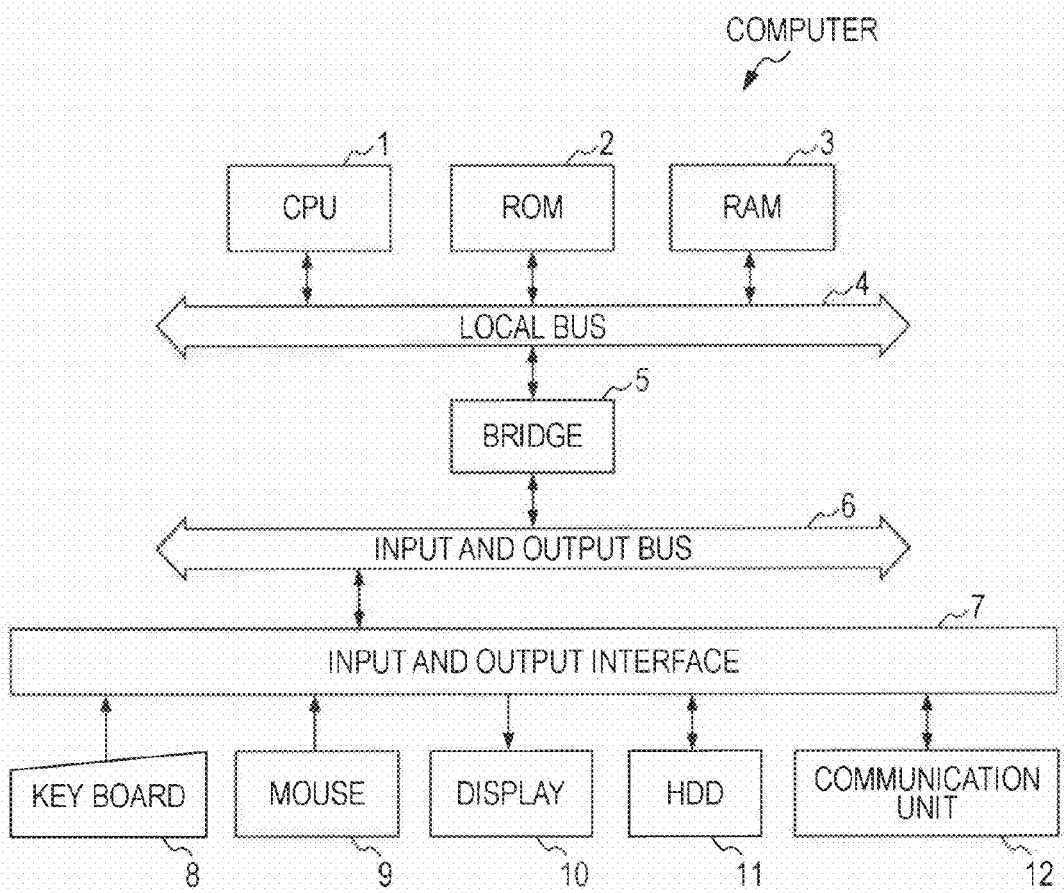

WIRELESS COMMUNICATION APPARATUS AND WIRELESS COMMUNICATION, AND COMPUTER PROGRAM

BACKGROUND OF THE INVENTION

1. Field of the Invention

The present invention relates to a wireless communication apparatus and a wireless communication, and a computer program with which packets in compliance with a predetermined standard format are received and processed. In particular, the invention relates to a wireless communication apparatus and a wireless communication, and a computer program with which packets in multiple formats in which two or more different types of preamble information and intra-header control information are multiplexed are received and processed.

2. Description of the Related Art

A wireless network draws attention as a system for freeing a wiring in a traditional wired communication system. As a standard specification related to the wireless network, IEEE (The Institute of Electrical and Electronics Engineers) 802.11 or IEEE 802.15 can be exemplified. For example, in IEEE 802.11a/g, as a standard specification related to a wireless LAN, an OFDM (Orthogonal Frequency Division Multiplexing) modulation system which is one of multi carrier systems is adopted.

In the wireless communication, in general, a preamble made of a repetition of sequences is prepended at the beginning of packets, and on a receiver side, the preamble is used to find the packets and perform a synchronization processing. Also, when the synchronization acquisition is ended in the preamble part, subsequent control information (SIGNAL field) in a header is decoded to obtain information used for data decoding such as a packet length, a modulation system, and an encoding system. Then, if the reception packets are addressed to its own station, the decoding processing is continuously performed over the relevant packets. If the reception packets are not addressed to its own station, an end time of the relevant packets is measured, and a sending operation stands by, so that mutual signal interference is avoided.

In addition, the specification of IEEE 802.11a/g supports a modulation system of achieving a maximum communication system of 54 Mbps, but a next generation wireless LAN specification for realizing a further higher bit rates is demanded. For example, as an expansion specification of IEEE 802.11, IEEE 802.11n adopting an OFDM_MIMO (Multiple Input Multiple Output) communication system is specified.

In a technological trend in which succeeding specifications are continuously established in this way, a communication environment is anticipated where packets in two or more different types of packet formats are transmitted on the same channel.

In such a communication environment, a wireless terminal in compliance with a succeeding specification is requested to have a compatibility with packet formats in compliance with older (legacy) specifications. For example, IEEE 802.11n allows a coexistence with a legacy terminal, but in order to solve a problem that the legacy terminal does not decode a MAC frame part transmitted in a high speed HT (High Throughput) part, that is, a Duration field in the MAC header is not interpreted and NAV is not properly set, a spoofing ("masquerade" or "impersonation") technology is applied in which a Rate field and a LENGTH field in a PHY header which can be decoded also by the legacy terminal is used to carry Duration information (for example, see Japanese Unexamined Patent Application Publication No. 2006-50526, paragraphs 0066 to 0068).

Also, in an environment where wireless communication apparatuses of various systems which use the same frequency band exist in a mixed manner, a wireless communication apparatus has been proposed which avoids an unwanted deterioration in a communication speed performance and maintains a fairness in speeds between the wireless communication apparatuses (for example, see Japanese Unexamined Patent Application Publication No. 2002-300172).

Furthermore, also while avoiding the channel congestion, in order to operation the network efficiently, the respective wireless terminals should correctly measure the sending end time of the reception packets from preamble information and intra-header control information in two or more different types of packet formats.

However, measurement means capable of coping with all modulation system and coding system indicated by the SIGNAL information including a packet transmission mode which is not supported by its own terminal should be prepared, and there is a problem that the mounting becomes complex, or the circuit scale is increased.

SUMMARY OF THE INVENTION

It is desirable to provide an excellent wireless communication apparatus and a wireless communication, and a computer program with which it is possible to desirably perform a reception processing on packets in compliance with a predetermined specification format.

Also, it is desirable to provide an excellent wireless communication apparatus and a wireless communication, and a computer program with which it is possible to desirably perform a reception processing on packets in the multiple formats in which two or more different types of preamble information and intra-header control information are multiplexed.

In addition, it is desirable to provide an excellent wireless communication apparatus and a wireless communication, and a computer program with which it is possible to correctly measure the end time of the reception packets in the multiple formats in which two or more different types of preamble information and intra-header control information are multiplexed.

Furthermore, it is desirable to provide an excellent wireless communication apparatus and a wireless communication, and a computer program with which it is possible to correctly measure the end time of the reception packets in the multiple formats in which the two or more different types of preamble information and intra-header control information are multiplexed.

According to an embodiment of the present invention, there is provided a wireless communication apparatus including:

a reception unit configured to receive packets in multiple formats in which two or more different types of preamble information and intra-header control information are multiplexed;

a demodulation and decode unit configured to demodulate and decode the received packets; and a measurement unit configured to measure a sending end time of the reception packets by selectively referring to any one of the intra-header control information on the basis of a transmission mode supported by the demodulation and decode unit.

In addition, the wireless communication apparatus according to the embodiment of the present invention may further include a determination unit configured to determine a reception signal power in the reception unit, and when a packet in a transmission mode which is not supported by the demodulation and decode unit is received, the measurement unit may measure the sending end time of the reception packets on the basis of a determination result of the determination unit.

Herein, specific examples of the packets in the multiple formats described in the present application include Mixed Format (MF) packets in which control information L-SIG compatible to IEEE 802.11a and control information HT-SIG not compatible to IEEE 802.11a which are standardized by IEEE 802.11n are multiplexed.

Then, in the wireless communication apparatus according to the embodiment of the present invention, in a case where a transmission mode indicated by the control information HT-SIG is not supported by the demodulation and decode unit, the measurement unit may measure the sending end time of the reception packets by using Rate information and LENGTH information indicated by the control information L-SIG.

In addition, in the wireless communication apparatus according to the embodiment of the present invention, in a case where a transmission mode indicated by the control information HT-SIG is not supported by the demodulation and decode unit, only when the LENGTH information indicated by the control information L-SIG is a value dividable by 3, the measurement unit may estimate the sending end time of the reception packets by using the Rate information and the LENGTH information indicated by the control information L-SIG.

In addition, in the wireless communication apparatus according to the embodiment of the present invention, in a case where the LENGTH information indicated by the control information L-SIG is a value not dividable by 3 and also a case where the reception packets are packets modulated by STBC, the measurement unit may set a time calculated by adding a time for 1 OFDM symbol to the sending end time measured on the basis of values indicated by MCS and LENGTH of the control information HT-SIG as a final sending end time.

In addition, in the wireless communication apparatus according to the embodiment of the present invention, in a case where the LENGTH information indicated by the control information L-SIG is a value not dividable by 3 and also a case where the reception packets are packets coded by LDPC, on the basis of values indicated by MCS and LENGTH of the control information HT-SIG, the measurement unit may set a time calculated by adding a time for 1 OFDM symbol to the sending end time obtained by measuring a hold time of CCA while the reception packets are treated in a normal transmission mode as a final sending end time.

In addition, in the wireless communication apparatus according to the embodiment of the present invention, in a case where the LENGTH information indicated by the control information L-SIG is a value not dividable by 3 and also a case where the reception packets are packets modulated by STBC and also coded by LDPC, on the basis of values indicated by MCS and LENGTH of the control information HT-SIG, the measurement unit may set a time calculated by adding a time for 2 OFDM symbols to the sending end time obtained by measuring a hold time of a CCA while the reception packets are treated in a normal transmission mode as a final sending end time.

In addition, in the wireless communication apparatus according to the embodiment of the present invention, in a case where the LENGTH information indicated by the control information L-SIG is a value not dividable by 3 and also a case where the reception packets are packets modulated by Short GI, on the basis of values indicated by MCS and LENGTH of the control information HT-SIG, the measurement unit may set a time calculated by adding a time which is obtained by multiplying a time for the number of total OFDM symbols by (−0.4) to the sending end time obtained by measuring a hold time of CCA while the reception packets are treated in a normal transmission mode as a final sending end time.

In addition, in the wireless communication apparatus according to the embodiment of the present invention, in a case where the LENGTH information indicated by the control information L-SIG is a value not dividable by 3 and also a case where the reception packets are packets modulated by Short GI and also modulated by STBC, on the basis of values indicated by MCS and LENGTH of the control information HT-SIG, the measurement unit may set a time calculated by adding a time for 1 OFDM symbol and a time which is obtained by multiplying a time for the number of total OFDM symbols by (−0.4) to the sending end time obtained by measuring a hold time of CCA while the reception packets are treated in a normal transmission mode as a final sending end time.

In addition, in the wireless communication apparatus according to the embodiment of the present invention, in a case where the LENGTH information indicated by the control information L-SIG is a value not dividable by 3 and also a case where the reception packets are packets modulated by Short GI and also coded by LDPC, on the basis of values indicated by MCS and LENGTH of the control information HT-SIG, the measurement unit sets a time calculated by adding a time for 1 OFDM symbol and a time which is obtained by multiplying a time for the number of total OFDM symbols by (−0.4) to the sending end time obtained by measuring a hold time of CCA while the reception packets are treated in a normal transmission mode as a final sending end time.

In addition, in the wireless communication apparatus according to the embodiment of the present invention, in a case where the LENGTH information indicated by the control information L-SIG is a value not dividable by 3 and also a case where the reception packets are packets modulated by Short GI, modulated by STBC, and also coded by LDPC, on the basis of values indicated by MCS and LENGTH of the control information HT-SIG, the measurement unit may set a time calculated by adding a time for 2 OFDM symbols and a time which is obtained by multiplying a time for the number of total OFDM symbols by (−0.4) to the sending end time obtained by measuring a hold time of CCA while the reception packets are treated in a normal transmission mode as a final sending end time.

In addition, in the wireless communication apparatus according to the embodiment of the present invention, a PHY layer may be configured to combine the hold time of the reception packets measured by the measurement unit and the determination result by the determination unit to perform a CCA report with respect to an MAC layer.

Also, according to another embodiment of the present invention, there is provided a wireless communication method for a wireless communication apparatus supporting a predetermined transmission mode, the method including the steps of:

processing reception packets in multiple formats in which two or more different types of preamble information and intra-header control information are multiplexed; and measuring a sending end time of the reception packets by selectively referring to any one of the intra-header control information on the basis of the supported transmission mode.

Furthermore, according to still another embodiment of the present invention, there is provided a computer program described in a computer readable manner for executing a processing of receiving packets in compliance with a predetermined standard format on a computer, the program instructing the computer to function as:

a reception unit configured to receive packets in multiple formats in which two or more different types of preamble information and intra-header control information are multiplexed;

a demodulation and decode unit configured to demodulate and decode the received packets; and a measurement unit configured to measure a sending end time of the reception packets by selectively referring to any one of the intra-header control information on the basis of a transmission mode supported by the demodulation and decode unit.

The computer program according to the embodiment of the present invention defines a computer program described in a computer readable manner for executing a predetermined processing on the computer. In other words, by installing the computer program according to the embodiment of the present invention into the computer, cooperative effects are exercised on the computer, and it is possible to obtain similar operational effects to those of the wireless communication apparatus according to the embodiment of the present invention.

According to the embodiment of the present invention, it is possible to provide the excellent wireless communication apparatus and the wireless communication, and the computer program with which the reception packets in the multiple formats in which the two or more different types of preamble information and intra-header control information are multiplexed can be appropriately received and processed.

Also, according to the embodiment of the present invention, it is possible to provide the excellent wireless communication apparatus and the wireless communication, and the computer program with which it is possible to correctly measure the end time of the reception packets in the multiple formats in which the two or more different types of preamble information and intra-header control information are multiplexed.

According to the embodiment of the present invention, when the synchronous detection of the packets sent by using the multiple formats in which the two or more different types of preamble information or SIGNAL information are multiplexed is performed, as the receiver refers to the signal information indicating the transmission mode supported by its own terminal to estimate the sending end time of the reception packets and control the sending opportunity of its own terminal, the signal processing unit for grasping the sending time in the transmission mode which is not supported by its own terminal is not mounted to the receiver. Thus, it is possible to reduce the circuit size and the power consumption.

Also, according to the embodiment of the present invention, even in a case where the packets in the transmission mode which is not supported in the demodulation and decode unit are received, by using only the reception signal power level as the determination criterion, the sending end time of the reception packets can be measured.

Also, according to the embodiment of the present invention, when the sending end time of the received packets is measured, if the modulation mode indicated by HT-SIG is not supported by its own terminal, instead of HT-SIG, by using the RATE information and the LENGTH information indicated by the control information L-SIG, it is possible to estimate the sending end time of the reception packets. The receiver omits the signal processing unit for grasping the sending time of the sending mode which is not supported by its own terminal, and it is possible to reduce the circuit size and the power consumption.

Also, according to the embodiment of the present invention, instead of the control information HT-SIG, by using the RATE information and the LENGTH information indicated by the control information L-SIG, when the sending end time of the reception packets is estimated, it can be checked that the LENGTH information of the control information L-SIG as standardized in the written PHY layer specification of IEEE 802.11 is the value dividable by 3.

Also, according to the embodiment of the present invention, even in a case where the LENGTH information indicated by the control information L-SIG is not the value dividable by 3, if the reception packets are the packets modulated by STBC, the time calculated by adding the time for the 1 OFDM symbol to the sending end time measured on the basis of the values indicated by MCS and LENGTH of the control information HT-SIG is set as the final sending end time. Thus, the receiver omits the signal processing unit for grasping the sending time of the sending mode which is not supported by its own terminal, and it is possible to reduce the circuit size and the power consumption.

Also, according to the embodiment of the present invention, even in a case where the LENGTH information indicated by the control information L-SIG is not the value dividable by 3, if the reception packets are the packets coded by LDPC, the time calculated by adding the time for the 1 OFDM symbol to the sending end time obtained by measuring the hold time of CCA while the reception packets are treated in the normal transmission mode is set as the final sending end time on the basis of the values indicated by MCS and LENGTH of the control information HT-SIG. Thus, the receiver omits the signal processing unit for grasping the sending time of the sending mode which is not supported by its own terminal, and it is possible to reduce the circuit size and the power consumption.

Also, according to the embodiment of the present invention, even in a case where the LENGTH information indicated by the control information L-SIG is not the value dividable by 3, if the reception packets are the packets modulated by STBC and coded by LDPC, the time calculated by adding the time for the 2 OFDM symbols to the sending end time obtained by measuring the hold time of CCA while the reception packets are treated in the normal transmission mode is set as the final sending end time on the basis of the values indicated by MCS and LENGTH of the control information HT-SIG. Thus, the receiver omits the signal processing unit for grasping the sending time of the sending mode which is not supported by its own terminal, and it is possible to reduce the circuit size and the power consumption.

Also, according to the embodiment of the present invention, even in a case where the LENGTH information indicated by the control information L-SIG is not the value dividable by 3, if the reception packets are the packets modulated by Short GI, the time calculated by adding the time which is obtained by multiplying the time for the number of total OFDM symbols by (−0.4) to the sending end time obtained by measuring the hold time of CCA while the reception packets are treated in the normal transmission mode as the final sending end time. Thus, the receiver omits the signal processing unit for grasping the sending time of the sending mode which is not supported by its own terminal, and it is possible to reduce the circuit size and the power consumption.

Also, according to the embodiment of the present invention, even in a case where the LENGTH information indicated by the control information L-SIG is not the value dividable by 3, if the reception packets are the packets modulated by Short GI and also modulated by STBC, the time calculated by adding the time for the 1 OFDM symbol and the time which is obtained by multiplying the time for the number of total OFDM symbols by (−0.4) to the sending end time obtained by measuring the hold time of CCA while the reception packets are treated in the normal transmission mode is set as the final sending end time on the basis of the values indicated by MCS and LENGTH of the control information HT-SIG. Thus, the receiver omits the signal processing unit for grasping the sending time of the sending mode which is not supported by its own terminal, and it is possible to reduce the circuit size and the power consumption.

Also, according to the embodiment of the present invention, even in a case where the LENGTH information indicated by the control information L-SIG is not the value dividable by 3, the time calculated by adding the time for the 1 OFDM symbol and the time which is obtained by multiplying the time for the number of total OFDM symbols by (−0.4) to the sending end time obtained by measuring the hold time of CCA while the reception packets are treated in the normal transmission mode is set as the final sending end time on the basis of the values indicated by MCS and LENGTH of the control information HT-SIG. Thus, the receiver omits the signal processing unit for grasping the sending time of the sending mode which is not supported by its own terminal, and it is possible to reduce the circuit size and the power consumption.

Also, according to the embodiment of the present invention, even in a case where the LENGTH information indicated by the control information L-SIG is not the value dividable by 3, the time calculated by adding the time for the 2 OFDM symbols and the time which is obtained by multiplying the time for the number of total OFDM symbols by (−0.4) to the sending end time obtained by measuring the hold time of CCA while the reception packets are treated in the normal transmission mode is set as the final sending end time on the basis of the values indicated by MCS and LENGTH of the control information HT-SIG. Thus, the receiver omits the signal processing unit for grasping the sending time of the sending mode which is not supported by its own terminal, and it is possible to reduce the circuit size and the power consumption.

Also, according to the embodiment of the present invention, the PHY layer can combine the hold time of the reception packets measured by the measurement unit and the determination result by the determination unit to perform the CCA report with respect to the MAC layer.

Further features of the present invention will become apparent from the following description of exemplary embodiments with reference to the attached drawings.

BRIEF DESCRIPTION OF THE DRAWINGS

FIG. 5 shows a format of an L-SIG field;

FIG. 11A is a flow chart showing another example of the processing procedure for the receiver operating in the MM mode of IEEE 802.11n to measure the end time of the reception packet corresponding to all the modulation systems and the coding systems indicated by the SIGNAL information also including the packet transmission mode which is not supported by its own terminal;

FIG. 11B is a flow chart showing another example of the processing procedure for the receiver operating in the MM mode of IEEE 802.11n to measure the end time of the reception packet corresponding to all the modulation systems and the coding systems indicated by the SIGNAL information also including the packet transmission mode which is not supported by its own terminal;

FIG. 11C is a flow chart showing another example of the processing procedure for the receiver operating in the MM mode of IEEE 802.11n to measure the end time of the reception packet corresponding to all the modulation systems and the coding systems indicated by the SIGNAL information also including the packet transmission mode which is not supported by its own terminal; and FIG. 12 shows a configuration example of a computer to which a wireless communication function is mounted.

DESCRIPTION OF THE PREFERRED EMBODIMENTS

Figure 1:
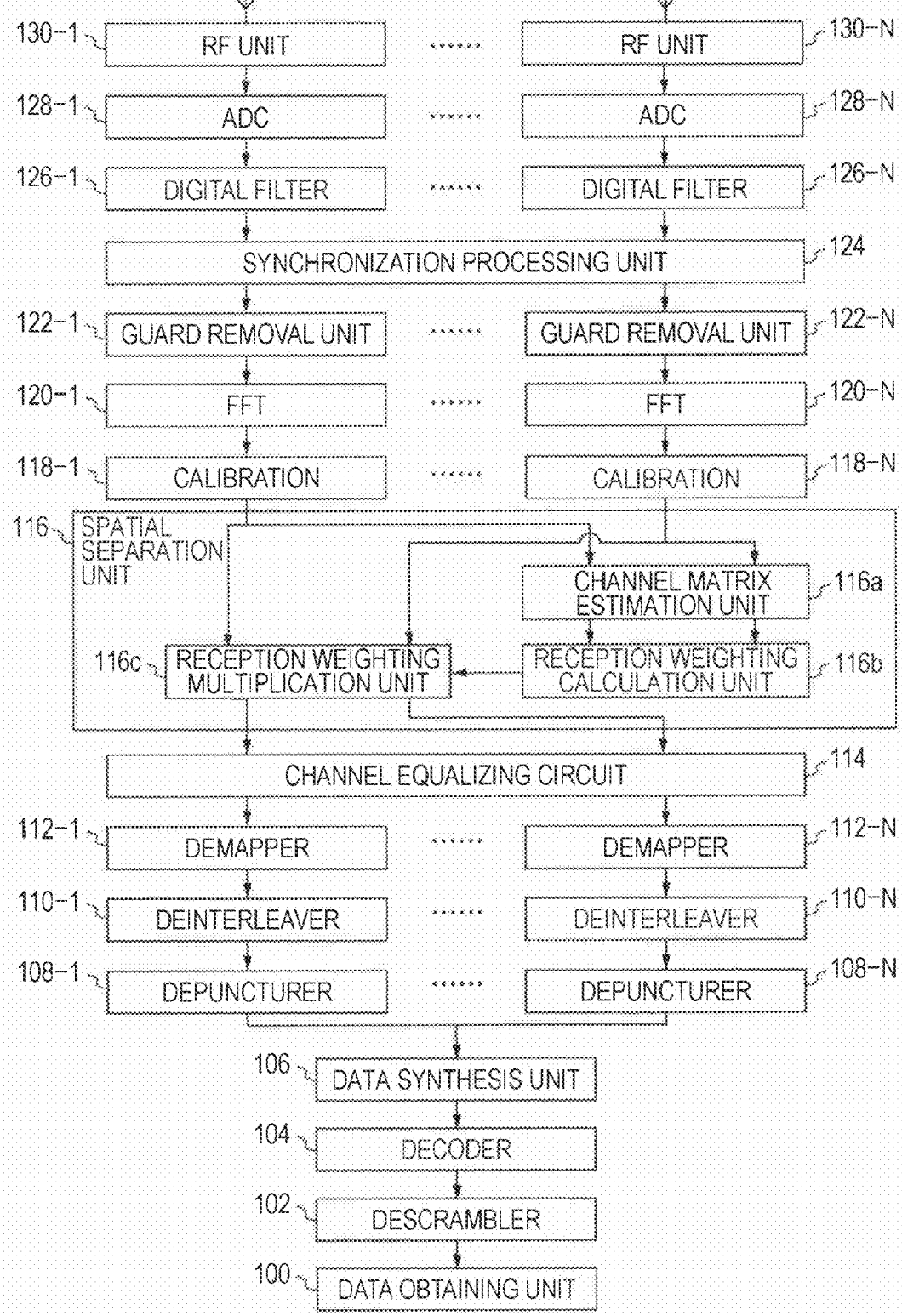
FIG. 1 shows a configuration example of a receiver side of the communication unit configured to perform an MIMO communication.

Hereinafter, embodiments of the present invention will be described in detail with reference to the drawings.

FIG. 12 shows a configuration example of a computer to which a wireless communication function is mounted.

A CPU (Central Processing Unit) 1 executes a program stored on a ROM (Read Only Memory) 2 or a hard disk drive (HDD) 11 under a program executing environment which is provided by an operating system (OS). For example, a synchronization processing on reception packets which will be described below or a part of the processing can also be realized in a mode where the CPU 1 executes a predetermined program.

The ROM 2 stores a program code such as POST (Power On Self Test) or BIOS (Basic Input Output System) on a permanent basis. A RAM (Random Access Memory) 3 is used for loading the program stored on the ROM 2 or the HDD 11 when the CPU 1 executes the program and temporarily holding operation data of the program in execution. These components are mutually connected via a local bus 4 directly connected to a local pin of the CPU 1.

The local bus 4 is connected to an input and output bus 6 such as a PCI (Peripheral Component Interconnect) bus via a bridge 5.

A key board 8 and a pointing device 9 such as a mouse are input devices operated by the user. A display 10 is composed of an LCD (Liquid Crystal Display), a CRT (Cathode Ray Tube), or the like and configured to display various information by way of texts and images.

The HDD 11 is a drive unit having a built-in hard disk as recording media and driving the hard disk. Programs executed by the CPU 1 such as the operation system and various applications are installed into the hard disk. Also, the hard disk is used for saving data files and the like.

A communication unit 12 is a wireless communication interface in compliance, for example, with IEEE 802.11a/n. The communication unit 12 is operated as an access point or a terminal station under an infrastructure mode, or is operated under an adhoc mode to execute a communication with other communication terminals existing in a communication range.

According to the present embodiment, the communication unit 12 is provided with a plurality of antenna elements on both the sender side and the receiver side and adopts an MIMO communication system in which spatially multiplexed streams are realized. On the sending branch side, space/time coding is applied on plural pieces of sending data to be multiplexed and sent to the channel while being distributed to the plurality of sending antennas. On the other hand, on the receiving branch side, space/time decoding is applied on the reception signal received by a plurality of reception antennas via the channel to be separated into the plural pieces of sending data to obtain the original data without cross talk between the streams. According to the MIMO communication system, without increasing the frequency band, the expansion in the transmission capacity is realized in accordance with the number of antennas, and it is possible to achieve the improvement in the communication speed.

FIG. 1 shows a configuration example of a receiver side of the communication unit 12 configured to perform an MIMO communication. The number of antennas of the receiver which is not shown (or, the number of reception branches) is N, and this N is 4 at maximum in compliance, for example, with the IEEE specification. The receiver which will be described below is configured to receive packets sent in a beam forming manner while applying different delay amounts for the respective sending branches.

The data delivered to the respective reception branches of the receiver via the channel is first subjected to an analog processing by an RF unit 130 in the respective receiving antenna branches.

In the RF unit 130, an amplification processing by an low noise amplifier (LNA), a down convert of the reception signals in an RF frequency band, an AGC (automatic gain control) for performing a normalization so that the electric power of the reception signal is set to be in a dynamic range of an AD converter 128, removal of a signal component other than a desired band by an analog low-pass filter (LPF), and the like are performed.

After the analog reception signal is converted into a digital signal by the AD converter (ADC) 128, the digital signal is input to the digital filter 126. Subsequently, in a synchronization processing unit 124, detection of the synchronization timing is performed, and also processings such as a frequency offset correction, a noise level estimate (or SNR), and the like are performed. The detection of the synchronization timing is performed by taking autocorrelation or intercorrelation of the existing training sequence included at the beginning of the received packet in a burst manner.

A guard removal unit 122 removes a guard interval prepended at the beginning of the data sending interval. Then, the time axis signal becomes a frequency axis signal by a fast Fourier transform unit (FFT) 120. Subsequently, in a calibration processing unit 118, with respect to the reception signal of the respective branches, calibration coefficients for correcting the imbalance of the phase and the amplitude between the sending and reception branches are respectively subjected to multiplication, and the imbalance correction for the imbalance of the phase and the amplitude existing between the reception branches in a digital unit.

In a spatial separation unit 116, a spatial separation processing for the spatially multiplexed reception signals is performed. To be more specific, a channel matrix estimate unit 116a assembles an estimate channel matrix H from a training sequence for exciting the channel matrix received by the respective branches. As a channel matrix in an opposite direction, this may be delivered to a beam formation sending weighting matrix calculation unit 114a on the sending side. Also, the antenna reception weighting matrix calculation unit 116b calculates a antenna reception weighting matrix W on the basis of the channel matrix H obtained by the channel matrix estimate unit 116a. Then, an antenna reception weighting matrix multiplication unit 116c performs a matrix multiplication of the reception vector having the reception streams as elements and the antenna reception weighting matrix W to carry out the spatial decoding of the spatially multiplied signals to obtain the signal sequences independent for each of the streams.

A channel equalizing circuit 114 applies a residual frequency offset correction, a channel tracking, and the like on the signal sequence for each stream. Then, a demapper 112 demaps the reception signal on an IQ signal space, a deinterleaver 110 deinterleaves, and a depuncturer 108 depunctures at a predetermined data rate.

A data synthesis unit 106 synthesizes the plurality of reception streams into one stream. This data synthesis processing performs an operation opposite to the data sorting performed on the sending side. Then, after an error correction decoding is performed in a decoder 104, on the basis of likelihood information, descramble is performed by a descrambler 102, and a data obtaining unit 200 obtains the reception data.

It should be noted that the respective blocks for performing the digital signal processing are controlled by a time base controller (TBC) not shown in the drawing, in which the time at which the processing should be started or the ending time, or, parameters used for the processing, or the like is appropriately input to the respective blocks fro the TBC.

Subsequently, a description will be provided of a packet format used in the communication system. The PHY layer of IEEE 802.11n is provided with a high throughput (HT) transmission mode (hereinafter, which will be also referred to as "HT mode") in which the transmission mode (Modulation and Coding Scheme: MCS) for the packets such as the modulation system and the coding system is different from those of IEEE 802.11a/g and also provided with an operation mode in which the data transmission is performed in the same packet format and in the same frequency area as those of IEEE 802.11a/g (hereinafter, which will be also referred to as "legacy mode"). In addition, the HT mode is divided into an operation mode referred to as "Mixed Mode (MM)" which has a compatibility with an existing terminal in compliance with IEEE 802.11a/g (hereinafter, which will be also referred to as "the legacy terminal") and an operation mode referred to as "Green Field (GF)" which has no compatibility with the legacy terminal.

Figure 2:
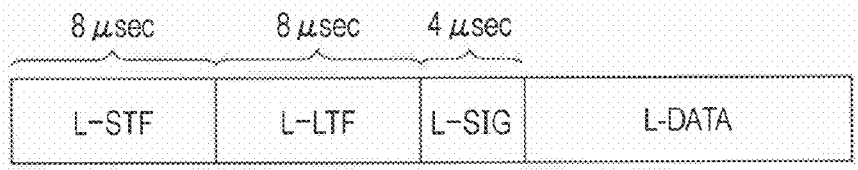
FIG. 2 shows a packet format in a legacy mode.
Figure 3:
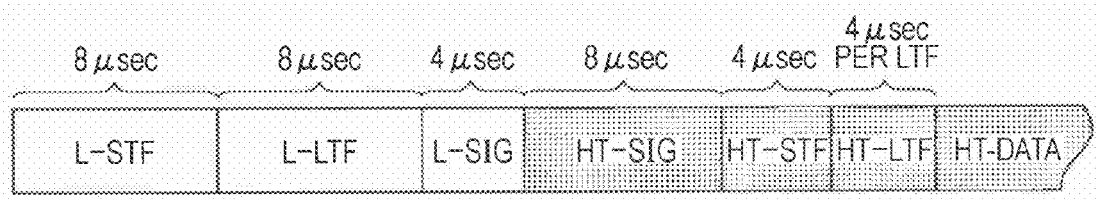
FIG. 3 shows a packet format in an MM mode.
Figure 4:
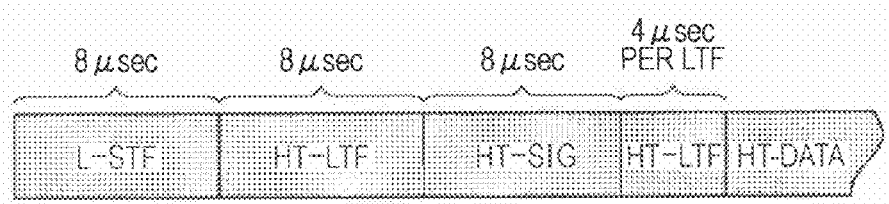
FIG. 4 shows a packet format in a GF mode.

FIGS. 2 to 4 shows packet formats in the respective operation modes of the legacy mode, MM, and GF. It should be noted that 1 OFDM symbol is 4 μsec in the respective drawing.

The packet under the legacy mode shown in FIG. 2 (hereinafter, which will be also referred to as "legacy packet") has the same format as that of IEEE 802.11a/g. The header part of the legacy packet is structured, as the legacy preamble, by L-STF (Legacy Short Training Field) composed of an existing OFDM symbol for finding the packet, L-LTF (Legacy Long Training Field) composed of an existing training symbol for synchronization acquisition and equalization, and L-SIG (Legacy SIGNAL Field) in which the transmission rate, the data length, and the like are described, and following this, payload (Data) is sent.

Also, the header unit of a Mixed Format packet (hereinafter, which will be also referred to as "MF packet") shown in FIG. 3 is structured by the legacy preamble having the same format as IEEE 802.11a/g, a preamble (hereinafter, which will be also referred to as "HT preamble") composed of a format unique to IEEE 802.11n (hereinafter, which will be also referred to as "HT format") following the legacy preamble, and a data part. In the MF packet, a part equivalent to a PHY payload in the legacy packet is structured in the HT format, and it is possible to grasp that the HT preamble and the PHY payload recursively structure this HT format.

The HT preamble is structured by HT-SIG, HT-STF, and HT-LTF. In the HT-SIG, control information used for interpreting the HT format such as the transmission mode (MCS) applied in the PHY payload (PSDU) and the data length of the payload is described. Also, HT-STF is structured by a training symbol for improving the AGC (automatic gain control) in the MIMO system. Also, HT-LTF is structured by a training symbol for estimating the channel for each of the input signals subjected to the spatial modulation (mapping) on the receiver side.

It should be noted that in the case of the MIMO communication in which two or more transmission branches are used, the spatial separation of the reception signal should be performed, and the channel matrixes should be obtained by estimating the channels for each of the reception antennas on the receiver side. For this reason, on the sender side, HT-LTF is sent in a time division manner from the respective antennas. Therefore, in accordance with the spatial streams, one or more HT-LTF fields are added.

The legacy preamble in the MF packet is the same format as the preamble of the legacy packet, and also the legacy terminal is transmitted in a decodable transmission system. In contrast to this, the HT format part after the HT preamble is transmitted in a decodable transmission system which is not coped with by the legacy terminal. The legacy terminal decodes the L-SIG in the legacy preamble of the MF packet to read that this is not addressed to its own station and to read the data length information and the like, and sets NAV (Network Allocation Vector) of an appropriate length. That is, by setting a sending standby period, it is possible to avoid the collision. As a result, the MF packet can realize the compatibility with the legacy terminal.

Also, a packet shown in FIG. 4 (hereinafter, which will be also referred to as "GF packet") is structured by only the HT format part. The preamble of the GF packet is structured by the L-STF field for the packet finding, the HT-LTF field for the channel estimate, the HT-SIG field in which information used for interpreting the HT format is described, and a 2nd HT-LTF field. In the MIMO communication, for obtaining the channel matrix by estimating the channel for each of the spatial streams, HT-LTF for the number of the sending antennas is sent in the time division manner in the 2nd HT-LTF field (same as above).

FIG. 5 shows a format of an L-SIG field. As shown in the drawing, in the L-SIG, the control information such as the transmission rate (RATE), and the palette length (LENGTH), used for decoding the packets in the legacy format is described. Also, the L-SIG is provided with a mechanism for a parity check (an even parity check with respect to 0 to 16 bits at the 17th bit from the higher level). However, as only 1 bit exists, the HT-SIG in the GF packet may be erroneously received as the L-SIG. Also, if the HT-SIG is erroneously received as the L-SIG, 5 to 16 of the HT-SIG at the first symbol are read as Length.

Figure 6:
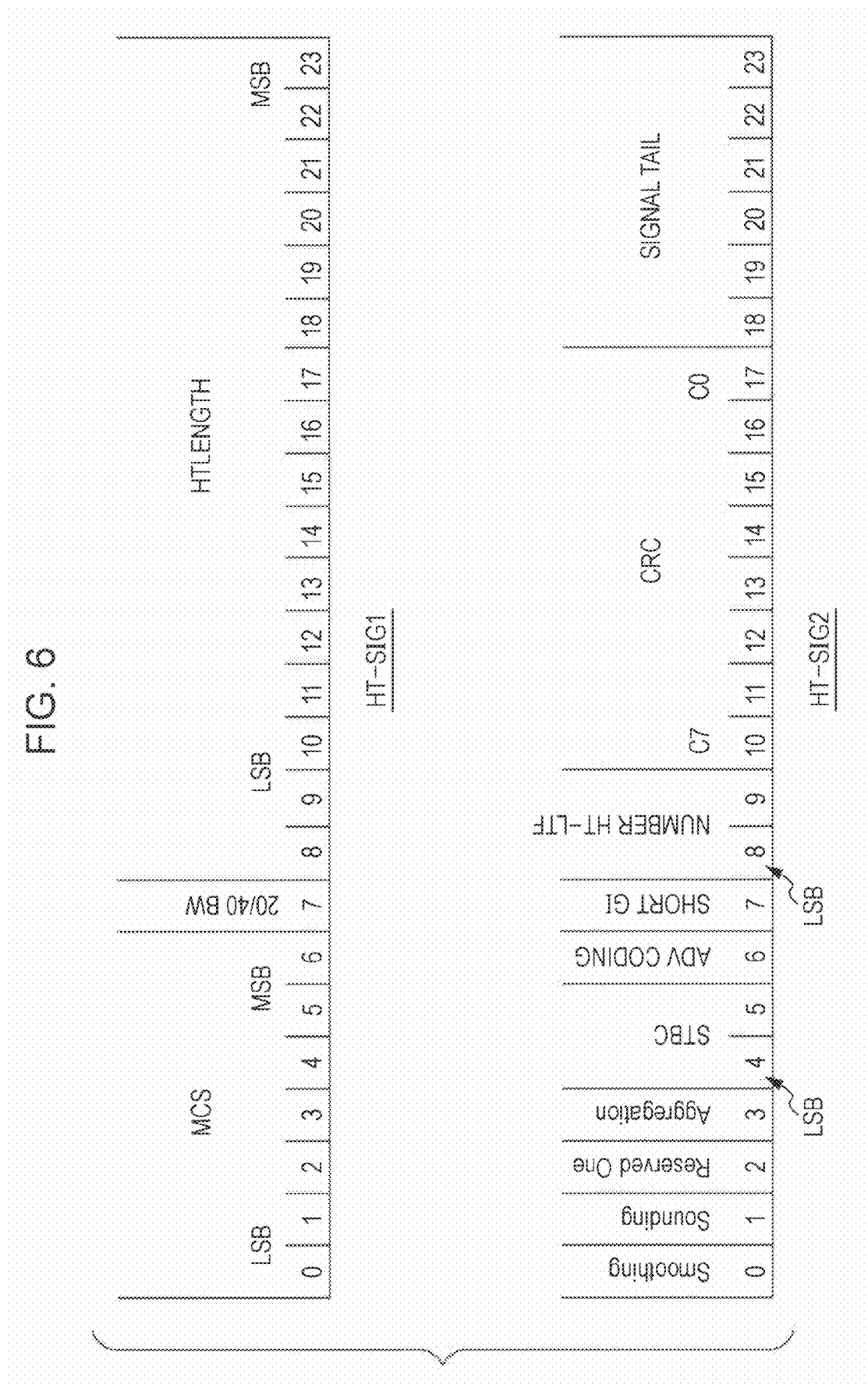
FIG. 6 shows a data structure of an HT-SIG field.

Also, FIG. 6 shows the data structure of the HT-SIG field. As shown in the drawing, the HT-SIG is structured by 2 OFDM symbols. The first symbol is set as HT-SIG1, and the second symbol 2 is set as HT-SIG2. In the HT-SIG, the control information used for interpreting the HT formats such as the transmission mode (MCS) applied in the PHY payload (PSDU) and the data length of the payload is described. In either the MF packet or the GF packet, the description contents in the HT-SIG field are the same. The definitions of the respective fields in the HT-SIG are shown in the following table.

TABLE 1

| Field Name | Num of Bits | Explanation and coding |
| --- | --- | --- |
| MCS | 7 | Index into The MCS table, LSB first |
| BW 20/40 | 1 | 0 if 20 MHz or 40 MHz upper/lower; 1 if 40 MHz |
| Length | 16 | The number of bytes of data in the PSDU-0*-65535 |
| Smoothing | 1 | 1-channel estimate smoothing is allowed<br>0-Only per-carrier independent(unsmoothed) channel estimate is recommended |
| Sounding | 1 | Indicates that the packet is a sounding packet.<br>0- Sounding Packet<br>1- 1-Not a sounding packet |
| reserved one | 1 | set to 1 |
| Aggregation | 1 | Set to 1 to indicate that the PPDU in the data portion of the packet contain an A-MPDU. Set to 0 otherwise |
| STBC | 2 | Indicates the difference between either the number pf space time streams $N_{STS}$ and the number of spatial streams $N_{SS}$ indicated by the MCS<br>00-No STBC ($N_{STS} = N_{SS}$) |
| Advanced Coding | 1 | 1-LDPC<br>0-BCC. |
| Short GI | 1 | Indicate that the short GI is used after the HT training |
| Number of Extension HT-LTF | 2 | Number of extension spatial stream(s) $N_{ESS}$.-<br>b' 00 - no extension spatial stream, b' 01-1 additional spatial stream, b' 102 additional streams, b' 113 additional spatial streams. |
| CRC | 8 | CRC of bits 0-23 in HT-SIG1 and bits 0-9 in HT-SIG2 |
| Tail Bits | 6 | Used to terminate the trellis of the convolution coder. Set to 0 |

The MF packet is the packet format which guarantees the compatibility with the legacy terminal. A shaded field among the packet formats shown in FIGS. 3 and 4 is a field which does not guarantee the compatibility with the legacy specification. The legacy terminal can decode the L-SIG field of the MF packet, but does not read the MAC header (in the HT-DATA field). Thus, the legacy terminal does not obtain the Duration information indicating a period in which sending standby should be performed. In view of the above, in the MF packet, in which the L-SIG can also be received by the legacy terminal, the transmission rate (Rate) information and the packet length (Length) information are disguised (spoof), and the sending standby is performed for a corresponding period (for example, see paragraph 0127 of Japanese Unexamined Patent Application Publication No. 2008-118692 which has been already assigned to the present applicant).

Also, IEEE 802.11n specifies optional modulation systems such as STBC (Space Time Block Code) or Short GI (Guard Interval) and LDPC (Low Density Parity Check code) which is optional as the coding system. For this reason, even in the case of the MM terminal operating in the HT mode, if the optional modulation system or coding system is not coped with, the MF packet which does not decode the HT-SIG also exists.

Figure 7:
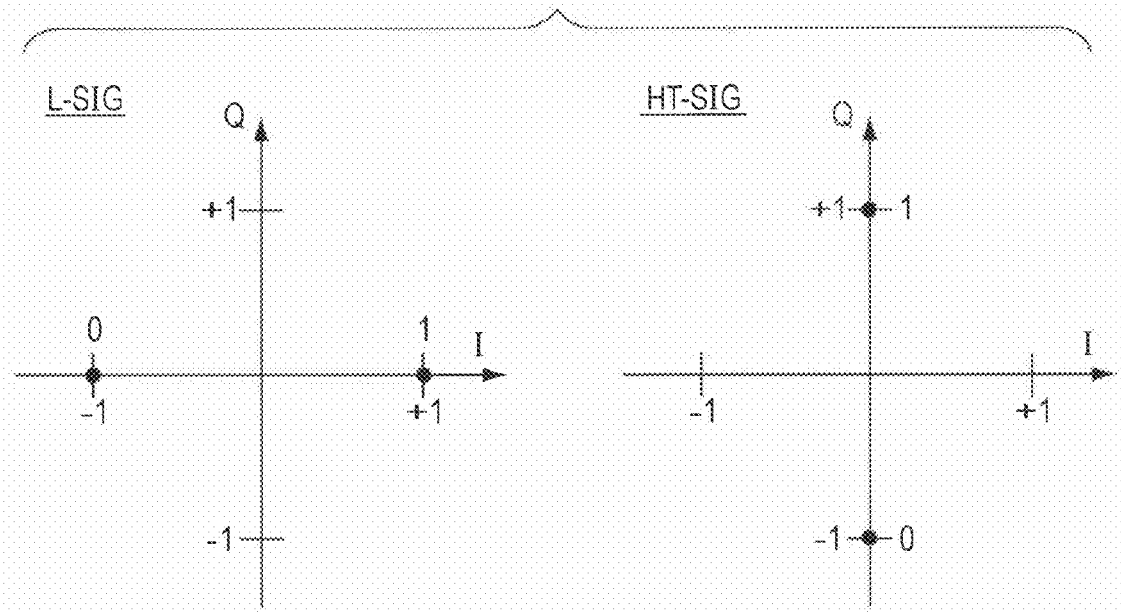
FIG. 7 is an explanatory diagram for describing a mechanism of performing a BPSK modulation of the HT-SIG field on a phase space which is rotated by 90 degrees with respect to the L-SIG field.

It should be noted that the HT-SIG field performs a BPSK modulation on a phase space rotated by 90 degrees with respect to the L-SIG field (or in fields before and after) (see FIG. 7). Such a rotation on the phase space is a specification for a purpose of distinguishing the legacy packet from the MF packet.

Also, positions of the OFDM symbols subjected to the BPSK modulation are different between the MF packet and the GF packet. Again, while making a comparison between FIG. 3 and FIG. 4, in the MF packet, the BPSK modulation is performed in which the BPSK modulation in which the phase rotation of 90 degrees at the 4th and 5th HT-SIG. On the other hand, in the GF packet, the BPSK modulation is performed in which the phase rotation of 90 degrees is effected at the OFDM symbol equivalent to the 3rd and 4th HT-SIG. It should be noted that the distinguishing method between the MF packet and the GF packet is, for example, disclosed in Japanese Unexamined Patent Application Publication No. 2007-221500 which has been already assigned to the present applicant. It should be noted that the gist of the present invention is not limited to the above-mentioned method of distinguishing whether the HT packet is the MF packet or the GF packet.

Figure 8:
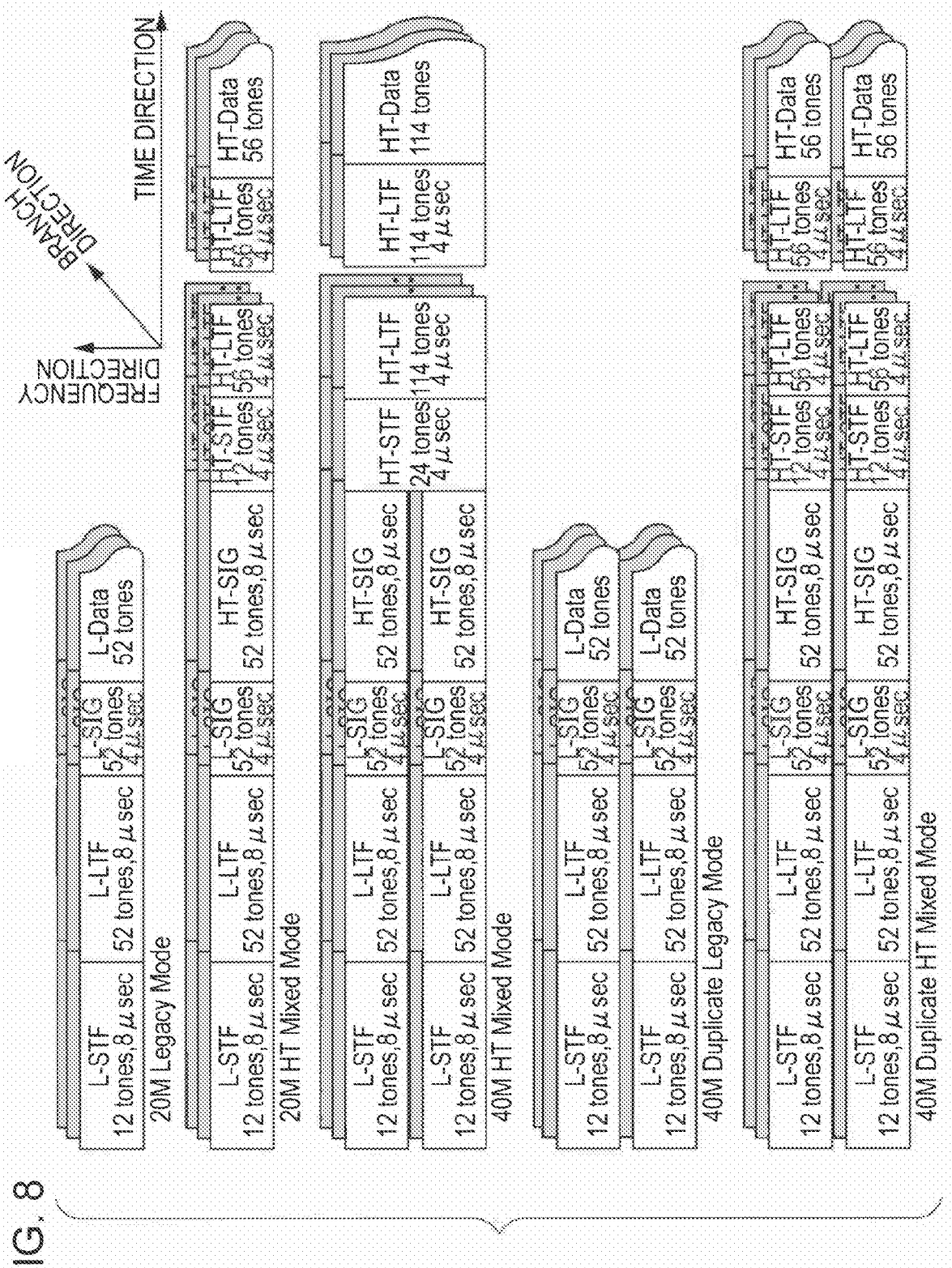
FIG. 8 shows a packet format of IEEE 802.11n.

Also, regarding the legacy mode and the MM mode, as shown in FIG. 8, total five types of the packet formats exists.

(1) Legacy mode using the 20 MHz band (in the example shown in the drawing, the structure of 3×3×1)

(2) HT Mixed mode using the 20 MHz band (in the example shown in the drawing, the structure of 3×3×N)

(3) HT Mixed mode in which the band width is expanded to 40 MHz band (in the example shown in the drawing, the structure of 3×3×N)

(4) 40M Duplicate Legacy mode in which 20 MHz band on the lower side (lower band) and 20 MHz band on the upper side (upper band) among 40 MHz band are used in an overlapping manner (in the example shown in the drawing, the structure of 3×3×1)

(5) 40M Duplicate HT Mixed mode in which 20 MHz band on the lower side (lower band) and 20 MHz band on the upper side (upper band) among 40 MHz band are used in an overlapping manner (in the example shown in the drawing, the structure of 3×3×N)

When the receiver (see FIG. 1) uses the preamble part of the packet and ends the synchronization acquisition, the receiver decodes the control information (SIGNAL field) in the following header to obtain the information such as the packet length, the modulation system, and the coding system.

Also, in the wireless LAN such as IEEE 802.11, the receiver is requested to assert a channel availability detection (Clear Channel Assessment: CCA) signal within 4 micro seconds from the beginning of the packet from the physical layer to the MAC (Media Access Control) layer. The CCA is an algorithm for the communication terminal to check the congestion in the channel. That is, the MAC layer determines that the channel is crowded during a period in which the CCA is asserted and stops the sending operation until the CCA is negated and it is determined that the channel is in a clear state. As a result, it is possible to avoid a situation that the respective signals interface one another while a plurality of wireless stations use the same carrier in an overlapping manner in terms of time, and the reception error is caused. The CCA can be performed in combination with a decoding performance of the reception signal as to whether the reception signal electric power exceeds an energy detection (ED) threshold.

As described above, in IEEE 802.11, succeeding specifications are established in sequence. In the network environment where different types of formats exist in a mixed manner, the receiver according to the present embodiment (see FIG. 1) performs the synchronization detection of the reception packets, and also irrespective of whether or not the format is supported up to the complete decoding by its own terminal, executes the signal processing for identifying up to the field reaching the SIGNAL information of the respective formats. Then, the receiver grasps the correct sending time of the relevant reception packets from the SIGNAL information, uses the modulation means and the LENGTH information, correctly estimates the hold time of the CCA or the sending end time of the reception packets, and controls the sending opportunity of its own terminal to prevent the sending packet collision.

Hereinafter, a description will be given of a method for the receiver to measure the end time of the reception packets while corresponding to all the modulation systems and all the coding systems indicated by the SIGNAL information including the packet transmission mode which is not supported by its own terminal.

Figure 9:
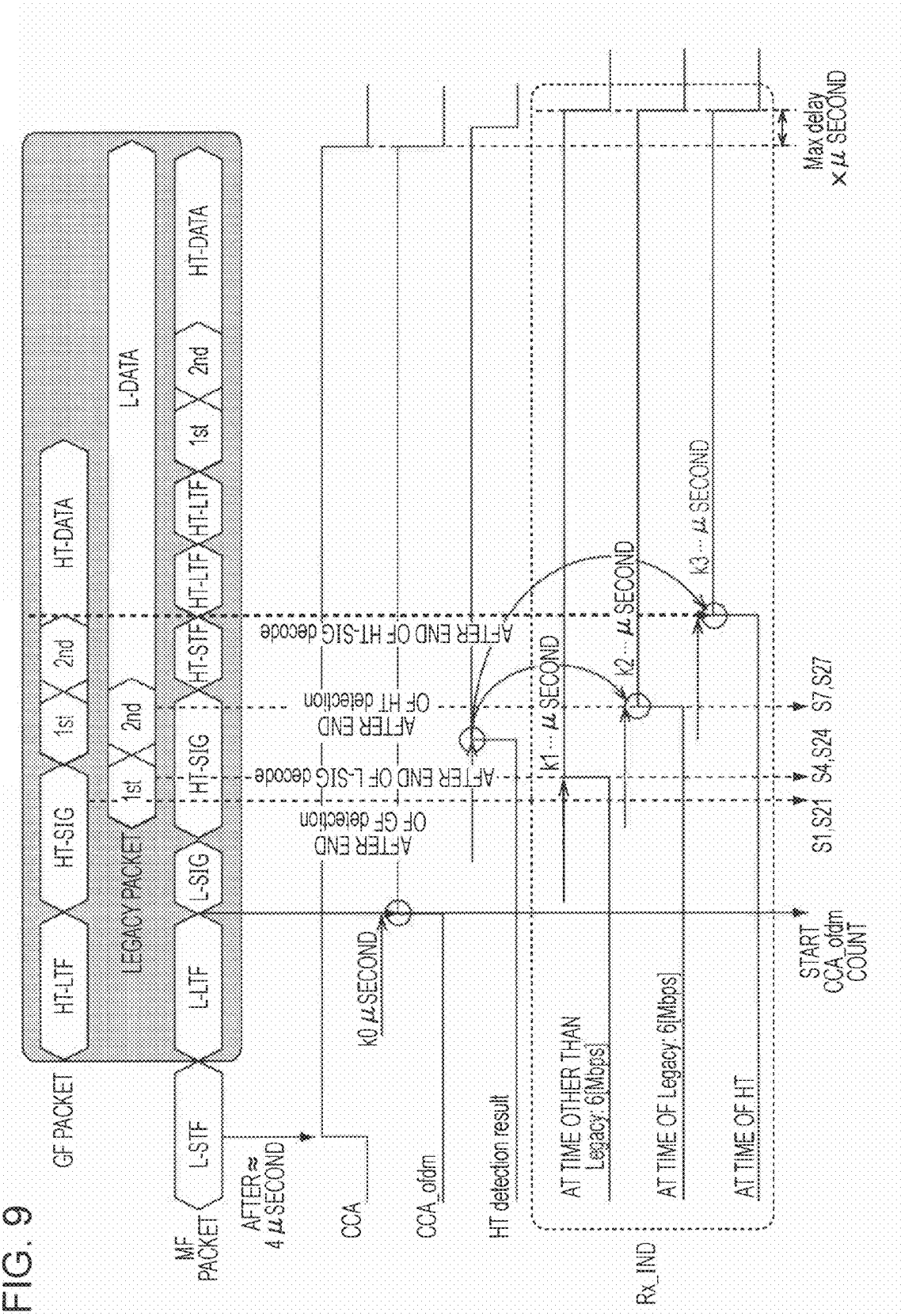
FIG. 9 is a timing chart showing a procedure of performing a reception processing on packets of the respective formats of a legacy packet, an MF packet, and a GF packet.

FIG. 9 shows a procedure for the receiver to perform a reception processing on packets of the respective formats of the legacy packet, the MF packet, and the GF packet by way of a timing chart.

In any of the packet formats, the receiver uses the L-STF field in which short training symbols are transferred in a burst manner to perform the packet finding (rough synchronization timing detection). Also, the receiver asserts the CCA within 4 micro seconds from the beginning of the packets.

In the case of the legacy packet and the MF packet, the subsequent L-LTF field is used to perform the detailed synchronization timing detection, and the synchronization is decided at the end of the field. Then, at the time k0 [micro second] corresponding to the end of the L-LTF field, a CCA_ofdm count is asserted. The CCA_ofdm count is a signal for detecting the rising edge, and before the decision on the rising edge is performed, the packet format should be determined. Also, at this time point, any one reception modes including the 20 MHz band area, the upper band of 40 MHz, the lower band of 40 MHz, the 40 MHz whole area is decided.

Subsequently, it is possible to detect that in the case of the GF packet, this is the GF packet in the vicinity of the 4th OFDM symbol from the beginning corresponding to the second half of H-SIG (GF detection).

Also, in the case of the legacy packet and the MF packet, in the vicinity of the 4th OFDM symbol from the beginning, the L-SIG decoding processing (L-SIG decode) is ended. Hereinafter, this time is set as k1 [micro second].

In the GF packet, the HT-SIG is the 3rd and 4th symbols. In the MF packet, the HT-SIG is the 4th and 5th symbols. In the case of the HT packet, in the vicinity of the 5th symbol, the detection of the packet format (HT detection) is ended. Hereinafter, this time is set as k2 [micro second].

Also, in the MF packet, the HT preamble includes HT-STF composed of a training symbol for improving the AGC after the HT-SIG. In the vicinity of the end of the HT-STF field, the decoding processing on the HT-SIG (HT-SIG decode) is ended. Hereinafter, this time is set as k2 [micro second]. In a case in which the reception packet is the legacy format and the transmission rate is not 6 Mbps, at the time k1, a packet reception indicator (Rx_Ind) is asserted. Also, when the reception packet is the legacy format and the transmission rate is 6 Mbps, in accordance with a situation in which the detection result of the HT packet (HT detection result) is asserted, at the time k2, the packet reception indicator (Rx- _Ind) is asserted. Also, when the reception packet is the HT format, in accordance with a situation in which the detection result of the HT packet (HT detection result) is asserted, at the time k3, the packet reception indicator (Rx_Ind) is asserted.

Figure 10:
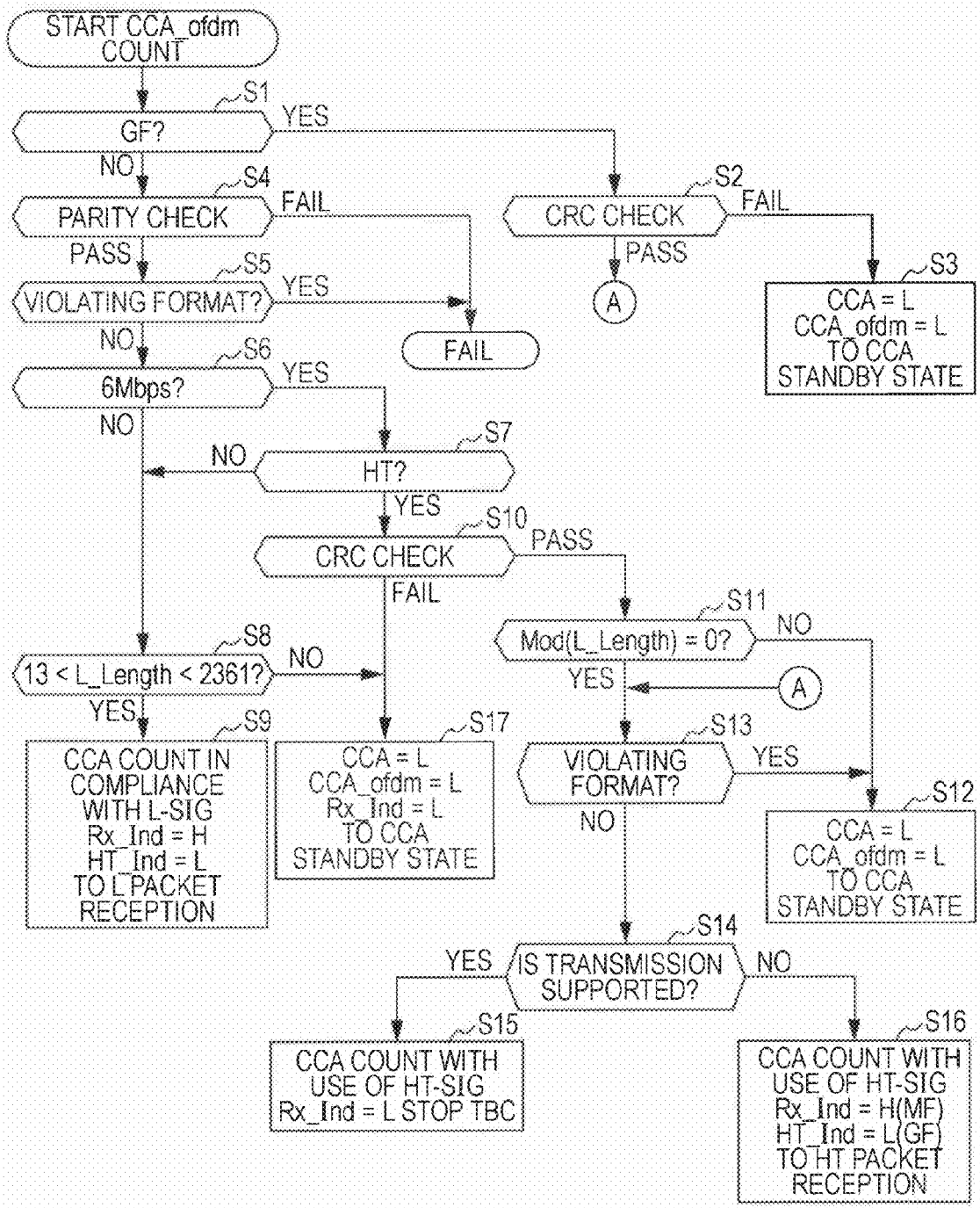
FIG. 10 is a flow chart showing an example of a processing procedure for a receiver operating in the MM mode of IEEE 802.11n to measure an end time of a reception packet corresponding to all modulation systems and coding systems indicated by SIGNAL information also including a packet transmission mode which is not supported by its own terminal.

FIG. 10 shows an example of a processing procedure for the receiver operating in the MM mode of IEEE 802.11n to measure the sending end time of the reception packets in a format of a flow chart while corresponding to all the modulation systems and all the coding systems indicated by the SIGNAL information including the packet transmission mode which is not supported by its own terminal.

At the time point of the above-mentioned time k0, any one of the reception modes of 20 MHz/40 MHz lower band/40 MHz upper band/40 MHz whole area is decided, and also the CCA_ofdm count is started. Then, in the vicinity of the 4th OFDM symbol corresponding to the HT-SIG2 of the GF packet, it is determined whether or not the reception packet is the GF format (step S1).

At this time, when it is determined that the reception packet is the GF format (Yes in step S1), the CRC check in the HT-SIG field is further performed (step S2). Then, when the CRC check is failed (Fail in step S2), the CCA and the CCA_ofdm are set as low, that is, negated, the flow is returned to the CCA standby state (step S3), and the present processing routine is ended.

Also, when it is determined that the reception packet is not the GF format (No in step S1), at a time point when the decoding processing of the L-SIG field (L-SIG decode) is ended, the parity check in the L-SIG is performed (step S4). Then, when the parity error is detected, it is supposed that the packet reception is failed, and the present processing routine is ended. At this time, the even parity check is used. It should be noted that due to a bit error or the like, in actuality, even when the packet reception error is generated, the parity check may be passed.

In a case where the parity error in the L-SIG is not detected (Pass in step S4), further, it is checked whether or not the contents of the rate information and the Length information in the L-SIG field are not violating the format (step S5). When the format is violated, the reception packets are discarded, and the present processing routine is ended.

On the other hand, when the description contents of the L-SIG are in compliance with the specified format (No in step S5), it is checked whether or not the Rate information of the L-SIG is specified as 6 Mbps as the transmission rate of the packets (step S6).

When the Rate information in the L-SIG indicates 6 Mbps (Yes in step S6), the reception packet may be either the HT packet (MF packet) or the legacy packet. In view of the above, at a time point of the above-mentioned time k2, it is distinguished whether the reception packet is which one of these packets (HT detection) (step S7). The method of distinguishing the MF packet and the GF packet is disclosed, for example, in Japanese Unexamined Patent Application Publication No. 2007-221500 (described above), but the gist of the present invention is not limited to this method.

In step S6, in a case where it is determined that the Rate information in the L-SIG does not indicate 6 Mbps, or in step S7, in a case where it is determined that the reception packet is the legacy packet, it is checked whether or not the Length information described in the L-SIG field is within the specified range (step S8). Then, when the Length information is within the specified range, the reception processing is performed as dealing with the legacy packet (step S9). That is, the sending end time of the reception packet is measured on the basis of the rate information and the Length information described in the L-SIG field, and the CCA count is started. Also, Rx_Ind is set as high, that is, asserted, and HTInd is set as low, that is, negated.

Also, in step S7, in a case where it is determined that the reception packet is the HT packet (that is, the MF packet), at a time point of the time k3 when the decoding processing of the MF packet in the HT-SIG field (HT-SIG decode) is completed, the CRC check in the HT-SIG is performed (step S10).

In step S8, in a case where it is determined that the Length information in L-SIG is out of the specified range, or in step S10, when the CRC check when the HT-SIG is failed, all the CCA, the CCA_ofdm, and the Rx_Ind are set as low, that is, negated, the flow is returned to the CCA standby state (step S17), and the present processing routine is ended.

When the CRC check in the HT-SIG in step S10 is passed, subsequently, it is checked whether or not the Length information described in the L-SIG field is a value dividable by 3 as specified in IEEE 802.11 (step S11).

In step S11, in a case where it is determined that the Length information in the L-SIG is a value dividable by 3, or in step S2, when the CRC check in the HT-SIG of the HT packet (GF packet) is passed, it is checked whether or not the description contents in the L-SIG field are not violating the format (step S13).

Also, in step S11, in a case where it is determined that Length information is not a value dividable by 3, or in step S13, in a case where it is determined that the HT-SIG is violating the format, the CCA and the CCA_ofdm are set as low, that is, negated, the flow is returned to the CCA standby state, and the present processing routine is ended (step S12).

On the other hand, when the description contents of the HT-SIG are in compliance with the specified format (No in step S13), subsequently, it is checked whether or not the transmission rate and the transmission mode specified by MCS in the HT-SIG field are supported by its own terminal (step S14).

Then, when the transmission rate and the transmission mode specified by MCS in the HT-SIG field are supported by its own terminal (No in step S14), the HT-SIG is used to measure the CCA count, that is, the sending end time of the reception packets, and the reception processing on the HT packet is performed (step S16). At this time, when the reception packet is MF, RX_Ind is set as high, that is, asserted, and when the reception packet is the GF format, RX_Ind is set as low, that is, negated.

On the other hand, when the transmission rate and the transmission mode specified by MCS in the HT-SIG field are not supported by its own terminal (Yes in step S14), without using the L-SIG, but by using the original HT-SIG, the measuring processing on the CCA count, that is, the sending end time of the reception packets is performed (step S15). At this time, Rx_Ind is set as low, that is, negated, and also the operation of the time base controller (described above) is stopped. When the time base controller is stopped, the operations of the respective blocks for performing the digital signal processing are stopped, and the low power consumption can be realized.

According to the processing procedure shown in FIG. 10, at a time point when the received packets in the multiple formats are identified as the HT packets, the MM receiver executes the reception operation following the HT-SIG (in other words, even if the L-SIG can be received and decoded, the information is not referred to). For this reason, in accordance with the modulation modes described in the HT-SIG (the normal mode, the STBC mode, the Short GI mode), the coding modes (the normal mode, the LDPC mode), the MCS, and the LENGTH information, the end time of the reception packets should be estimated. Therefore, even when the MM receiver does not support LDPC, STBC, and Short GI which are optional modes, the MM receiver is provided with different easement means independently to those. Thus, the mounting accordingly becomes complex, or the circuit scale is increased.

In contrast to this, in accordance with whether or not its own terminal supports the mode for modulating or coding the reception packets, a method of deciding which SIGNAL information included in the multiple packets should be referred to and measuring the end time of the reception packets is also considerable.

To be more specific, when the MF packet is received, in the case of the modulation modes (the normal mode, the STBC mode, the Short GI mode), the coding modes (the normal mode, the LDPC mode), and MCS which are not supported by its own terminal, the reception operation is executed following the L-SIG instead of the HT-SIG. That is, the RATE and LENGTH L-SIG are used to measure the hold time of the CCA.

It should be however that when the L-SIG is substituted for the SIGNAL information of the MF packet, it is checked whether or not the respective values of RATE and LENGTH succeed the CRC check of the HT-SIG of the HT packet and also the LENGTH information of the control information L-SIG as specified in the written PHY layer specification of IEEE 802.11 is the value dividable by 3.

When the above-mentioned check is not passed, it is determined that the MM receiver does not correctly measure the end time of the reception packets. In this case, the MM receiver uses, for example, the determination criterion for only the reception electric power level to assert the CCA.

Also, in a case where the reception packet is modulated by STBC or coded by LDPC, the MM receiver deals with the packet in the normal transmission mode and sets a time obtained by adding a time for 1 or 2 OFDM symbols (that is, 4 or 8 micro seconds) to the sending end time obtained by measuring the hold time of the CCA as a final sending end time.

In addition, in a case where the reception packet is modulated by Short GI, the MM receiver deals with the packet in the normal transmission mode and sets a time obtained by subtracting total OFDM symbols×(−0.4) micro seconds from the sending end time obtained by measuring the hold time of the CCA as a final sending end time.

In the case of the GF packet instead of the reception packet is not the MF packet and the transmission mode which is out of the support by its own terminal too, the above-mentioned easement method for the sending end time can be similarly applied.

FIGS. 11A to 11C show a processing procedure for the receiver operating in the MM mode of IEEE 802.11n to selectively use any one of the SIGNAL information in accordance with the modulation system and the coding system of the received HT packet to measure the end time of the reception packets in a flow chart format.

At the time point of the above-mentioned time k0, any one of the reception modes of 20 MHz/40 MHz lower band/40 MHz upper band/40 MHz whole area is decided, and also the CCA_ofdm count is started. Then, in the vicinity of the 4th OFDM symbol corresponding to the HT-SIG2 of the GF packet, it is determined whether or not the reception packet is the GF format (step S21).

At this time, when it is determined that the reception packet is the GF format (Yes in step S21), the CRC check in the HT-SIG field is further performed (step S22). Then, when the CRC check is failed (Fail in step S22), the CCA and the CCA_ofdm are set as low, that is, negated, the flow is returned to the CCA standby state (step S23), and the present processing routine is ended.

Also, when it is determined that the reception packet is not the GF format (No in step S21), when the decoding processing of the L-SIG field (L-SIG decode) is ended, the parity check in the L-SIG is performed (step S24). Then, when the parity error is detected, the CCA and the CCA_ofdm are set as low, that is, negated, the flow is returned to the CCA standby state (step S24-1: FIG. 11B), and the present processing routine is ended.

In a case where the parity error in the L-SIG is not detected (Pass in step S24), it is further checked whether or not the contents of the rate information and the Length information in the L-SIG field are not violating the format (step S25). When the format is violated, the CCA and the CCA_ofdm are set as low, that is, negated, the flow is returned to the CCA standby state (step S25-1: FIG. 11C), and the present processing is ended.

On the other hand, when the description contents of the L-SIG are in compliance with the specified format (No in step S25), it is checked whether or not the Rate information of the L-SIG is specified as 6 Mbps as the transmission rate of the packets (step S26).

When the Rate information in the L-SIG indicates 6 Mbps (Yes in step S26), the reception packet may be either the HT packet (MF packet) or the legacy packet. In view of the above, at a time point of the above-mentioned time k2, it is determined whether the reception packet is which one of these (HT detection) (step S27).

In step S26, in a case where it is determined that the Rate information in the L-SIG does not indicate 6 Mbps, or in step S27, in a case where it is determined that the reception packet is the legacy packet, it is checked whether or not the Length information described in the L-SIG field is within the specified range (step S28). Then, when the Length information is within the specified range, in compliance with the description contents of the L-SIG, and the sending end time of the reception packet is measured on the basis of the rate information and the Length information (step S29). Also, the CCA count is started. In addition, Rx_Ind is set as high, that is, asserted, and HTInd is set as low, that is, negated. The reception processing is performed as dealing with the legacy packet.

Also, in step S27, in a case where it is determined that the reception packet is the HT packet (that is, the MF packet), at the time point of the time k3 when the decoding processing of the MF packet in the HT-SIG field (HT-SIG decode) is completed, the CRC check in the HT-SIG is performed (step S30).

In step S28, in a case where it is determined that the Length information in the L-SIG is out of the specified range, or in step S30, when the CRC check when the HT-SIG is failed, the CCA, the CCA_ofdm, and the Rx_Ind are set as low, that is, negated, the flow is returned to the CCA standby state (step S37), and the present processing routine is ended.

In step S30, when the CRC check in the HT-SIG is passed, subsequently, it is checked whether or not the Length information described in the L-SIG field is a value dividable by 3 as specified in IEEE 802.11 (step S31).

In step S31, it is checked that it is determined that the Length information in the L-SIG is a value dividable by 3, or in step S22, when the CRC check in the HT-SIG of the HT packet (GF packet) is passed, it is checked whether or not the description contents in the L-SIG field are not violating the format (step S33).

Also, in step S31, it is checked that it is determined that the Length information is not a value dividable by 3, or in step S33, it is checked that it is determined that the HT-SIG is violating the format, the CCA and the CCA_ofdm are set as low, that is, negated, the flow is returned to the CCA standby state, and the present processing routine is ended (step S32).

On the other hand, when the description content of the HT-SIG is not violating the specified format (No in step S33), subsequently, it is checked whether or not the transmission rate and the transmission mode specified by MCS in the HT-SIG field are supported by its own terminal (step S34).

Then, when the transmission rate and the transmission mode specified by MCS in the HT-SIG field are supported by its own terminal (No in step S34), the L-SIG (it should be noted that only at in the case of the MF packet) or the HT-SIG is used to measure the CCA count, that is, the sending end time of the reception packets, and the reception processing on the HT packet is performed (step S36). At this time, when the reception packet is MF, RX_Ind is set as high, that is, asserted, and when the reception packet is the GF format, RX_Ind is set as low, that is, negated.

On the other hand, when the transmission rate and the transmission mode specified by MCS in the HT-SIG field are not supported by its own terminal (Yes in step S34), in the case of the MF packet, the L-SIG is followed instead of the HT-SIG, and in the case of the GF packet, the HT-SIG is followed. The measurement processing for the CCA count, that is, the sending end time of the reception packets is performed (step S35). At this time, Rx_Ind is set as low, that is, negated, and also the operation of the time base controller (described above) is stopped. When the time base controller is stopped, the operations of the respective blocks for performing the digital signal processing are stopped, and the low power consumption can be realized.

To elaborate, according to the processing procedure shown in FIGS. 11A to 11C, in the network environment where different types of formats exist in a mixed manner, irrespective of whether or not the format is supported up to the complete decoding by its own terminal, the receiver executes the signal processing for identifying up to the field reaching the SIGNAL information of the respective formats. Then, the receiver grasps the correct sending time of the relevant reception packets from the SIGNAL information, uses the modulation means and the LENGTH information, and correctly estimates the sending end time of the reception packets. Thus, the receiver controls the sending opportunity of its own terminal, and it is possible to prevent the sending packet collision. The processing procedure carried out at this time will be summarized below.

(1) When the synchronous detection of the packets sent by using the multiple formats in which the two or more different types of preamble information or SIGNAL information are multiplexed is performed, the receiver refers to the SIGNAL information indicating the transmission mode supported by its own terminal to estimate the sending end time of the reception packets and controls the sending opportunity of its own terminal.

As a result, the signal processing unit for grasping the sending time in the transmission mode which is not supported by its own terminal is not mounted to the receiver, and it is possible to reduce the circuit size and the power consumption.

(2) The packets in the multiple formats mentioned in (1) described above specifically refers to the MF packet in which the control information L-SIG and the control information HT-SIG are multiplied. When the MF packet is detected, the MM terminal uses the modulation mode indicated by the SIGNAL information or the LENGTH value to measure the end time of the reception packets. At that time, in a case where the modulation mode indicated by the control information HT-SIG is an optional modulation system or coding method not supported by its own terminal, the RATE information and the LENGTH information indicated by the control information L-SIG are used to estimate the sending end time of the reception packets, and the sending opportunity of its own terminal is controlled. As a result, the signal processing unit for grasping the sending time in the transmission mode not supported by its own terminal, and it is possible to reduce the circuit size and the power consumption.

(3) Related to (2) described above, only in a case where the LENGTH information indicated by the control information L-SIG is a value dividable by 3, the RATE information and the LENGTH information indicated by the control information L-SIG is used to estimate the sending end time of the reception packets, and the sending opportunity of its own terminal is controlled.

(4) Related to (3) described above, in a case where the LENGTH information indicated by L-SIG is not a value dividable by 3, and also if the reception packets are the packets modulated by STBC, on the basis of the values indicated by MCS and LENGTH of the control information HT-SIG, the time calculated by adding the time for the 1 OFDM symbol (4 μsec) to the sending end time obtained by measuring the hold time of CCA reception packets are treated in the normal transmission mode is set as the final sending end time.

(5) Related to (3) described above, in a case where the LENGTH information indicated by L-SIG is not a value dividable by 3, and also if the reception packets are the packets coded by LDPC, on the basis of the values indicated by MCS and LENGTH of the control information HT-SIG, the time calculated by adding the time for the 1 OFDM symbol (4 μsec) to the sending end time obtained by measuring the hold time of CCA reception packets are treated in the normal transmission mode is set as the final sending end time.

(6) Related to (3) described above, in a case where the LENGTH information indicated by L-SIG is not a value dividable by 3, and also if the reception packets are the packets modulated by STBC and coded by LDPC, on the basis of the values indicated by MCS and LENGTH of the control information HT-SIG, the time calculated by adding the time for the 2 OFDM symbols (8 μsec) to the sending end time obtained by measuring the hold time of CCA reception packets are treated in the normal transmission mode is set as the final sending end time.

(7) Related to (2) described above, in a case where the LENGTH information indicated by L-SIG is not a value dividable by 3, and also if the reception packets are the packets modulated by Short GI, on the basis of the values indicated by MCS and LENGTH of the control information HT-SIG, the time calculated by adding the time which is obtained by multiplying the time for the number of total OFDM symbols by (−0.4) to the sending end time obtained by measuring the hold time of CCA while the reception packets are treated in the normal transmission mode is set as the final sending end time.

(8) Related to (3) and (7) described above, in a case where the LENGTH information indicated by L-SIG is not a value dividable by 3, and also if the reception packets are the packets modulated by Short GI and also modulated by STBC, on the basis of the values indicated by MCS and LENGTH of the control information HT-SIG, the time calculated by adding the time for the 1 OFDM symbol (4 μsec) and the time which is obtained by multiplying the time for the number of total OFDM symbols by (−0.4) to the sending end time obtained by measuring the hold time of CCA while the reception packets are treated in the normal transmission mode is set as the final sending end time.

(9) Related to (3) and (7) described above, in a case where the LENGTH information indicated by L-SIG is not a value dividable by 3, and also if the reception packets are the packets modulated by Short GI and also coded by LDPC, on the basis of the values indicated by MCS and LENGTH of the control information HT-SIG, the time calculated by adding the time for the 1 OFDM symbol (4 µsec) and the time which is obtained by multiplying the time for the number of total OFDM symbols by (−0.4) to the sending end time obtained by measuring the hold time of CCA while the reception packets are treated in the normal transmission mode is set as the final sending end time.

(10) Related to (6) and (7) described above, in a case where the LENGTH information indicated by L-SIG is not a value dividable by 3, and also if the reception packets are the packets modulated by Short GI, modulated by STBC, and also coded by LDPC, on the basis of the values indicated by MCS and LENGTH of the control information HT-SIG, the time calculated by adding the time for the 2 OFDM symbol (8 µsec) and the time which is obtained by multiplying the time for the number of total OFDM symbols by (−0.4) to the sending end time obtained by measuring the hold time of CCA while the reception packets are treated in the normal transmission mode is set as the final sending end time.

Then, the PHY layer of the receiver may combine the hold time of the reception packets measured by any one of the method described above in (2) to (10) with the determination criterion of the reception signal power level to perform the CCA report with respect to the MAC layer.

The present application contains subject matter related to that disclosed in Japanese Priority Patent Application JP 2008-264729 filed in the Japan Patent Office on Oct. 14, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus, comprising:
a reception unit configured to receive packets in multiple formats in which two or more different types of preamble information and intra-header control information are multiplexed;
a demodulation and decode unit configured to demodulate and decode the received packets; and
a measurement unit configured to measure a sending end time of the reception packets by selectively referring to any one of the intra-header control information on the basis of a transmission mode supported by the demodulation and decode unit, wherein
the packets in the multiple formats are Mixed Format (MF) packets in which control information L-SIG compatible to IEEE 802.11a and control information HT-SIG not compatible to IEEE 802.11a which are specified by IEEE 802.11n are multiplexed,
in a case where a transmission mode indicated by the control information HT-SIG is not supported by the demodulation and decode unit, the measurement unit measures the sending end time of the reception packets by using RATE information and LENGTH information indicated by the control information L-SIG, and
in a case where a transmission mode indicated by the control information HT-SIG is not supported by the demodulation and decode unit, only when the LENGTH information indicated by the control information L-SIG is a value dividable by 3, the measurement unit estimates the sending end time of the reception packets by using the RATE information and the LENGTH information indicated by the control information L-SIG.

2. The wireless communication apparatus according to claim 1,
wherein in a case where the LENGTH information indicated by the control information L-SIG is a value not dividable by 3 and also a case where the reception packets are packets modulated by STBC, the measurement unit sets a time calculated by adding a time for 1 OFDM symbol to the sending end time measured on the basis of values indicated by MCS and LENGTH of the control information HT-SIG as a final sending end time.

3. The wireless communication apparatus according to claim 1,
wherein in a case where the LENGTH information indicated by the control information L-SIG is a value not dividable by 3 and also a case where the reception packets are packets coded by LDPC, on the basis of values indicated by MCS and LENGTH of the control information HT-SIG, the measurement unit sets a time calculated by adding a time for 1 OFDM symbol to the sending end time obtained by measuring a hold time of CCA while the reception packets are treated in a normal transmission mode as a final sending end time.

4. The wireless communication apparatus according to claim 1,
wherein in a case where the LENGTH information indicated by the control information L-SIG is a value not dividable by 3 and also a case where the reception packets are packets modulated by STBC and also coded by LDPC, on the basis of values indicated by MCS and LENGTH of the control information HT-SIG, the measurement unit sets a time calculated by adding a time for 2 OFDM symbols to the sending end time obtained by measuring a hold time of CCA while the reception packets are treated in a normal transmission mode as a final sending end time.

5. The wireless communication apparatus according to claim 1,
wherein in a case where the LENGTH information indicated by the control information L-SIG is a value not dividable by 3 and also a case where the reception packets are packets modulated by Short GI, on the basis of values indicated by MCS and LENGTH of the control information HT-SIG, the measurement unit sets a time calculated by adding a time which is obtained by multiplying a time for the number of total OFDM symbols by (−0.4) to the sending end time obtained by measuring a hold time of CCA while the reception packets are treated in a normal transmission mode as a final sending end time.

6. The wireless communication apparatus according to claim 1,
wherein in a case where the LENGTH information indicated by the control information L-SIG is a value not dividable by 3 and also a case where the reception packets are packets modulated by Short GI and also modulated by STBC, on the basis of values indicated by MCS and LENGTH of the control information HT-SIG, the measurement unit sets a time calculated by adding a time for 1 OFDM symbol and a time which is obtained by multiplying a time for the number of total OFDM symbols by (−0.4) to the sending end time obtained by measuring a hold time of CCA while the reception packets are treated in a normal transmission mode as a final sending end time.

7. The wireless communication apparatus according to claim 1,
wherein in a case where the LENGTH information indicated by the control information L-SIG is a value not dividable by 3 and also a case where the reception packets are packets modulated by Short GI and also coded by LDPC, on the basis of values indicated by MCS and LENGTH of the control information HT-SIG, the measurement unit sets a time calculated by adding a time for 1 OFDM symbol and a time which is obtained by multiplying a time for the number of total OFDM symbols by (−0.4) to the sending end time obtained by measuring a hold time of CCA while the reception packets are treated in a normal transmission mode as a final sending end time.

8. The wireless communication apparatus according to claim 1,
wherein in a case where the LENGTH information indicated by the control information L-SIG is a value not dividable by 3 and also a case where the reception packets are packets modulated by Short GI, modulated by STBC, and also coded by LDPC, on the basis of values indicated by MCS and LENGTH of the control information HT-SIG, the measurement unit sets a time calculated by adding a time for 2 OFDM symbols and a time which is obtained by multiplying a time for the number of total OFDM symbols by (−0.4) to the sending end time obtained by measuring a hold time of CCA while the reception packets are treated in a normal transmission mode as a final sending end time.

9. The wireless communication apparatus according to any one of claims 1 to 8, further comprising:
a determination unit configured to determine a reception signal power in the reception unit,
wherein a PHY layer combines the hold time of the reception packets measured by the measurement unit and the determination result by the determination unit to perform a CCA report with respect to an MAC layer.

10. A wireless communication method for a wireless communication apparatus supporting a predetermined transmission mode, the method comprising:
processing reception packets in multiple formats in which two or more different types of preamble information and intra-header control information are multiplexed;
measuring a sending end time of the reception packets by selectively referring to any one of the intra-header control information when the packets are transmitted via the supported predetermined transmission mode, wherein
the packets in the multiple formats are Mixed Format (MF) packets in which control information L-SIG compatible to IEEE 802.11a and control information HT-SIG not compatible to IEEE 802.11a which are specified by IEEE 802.11n are multiplexed,
in a case where a transmission mode indicated by the control information HT-SIG is not supported, the measuring includes measuring the sending end time of the reception packets by using RATE information and LENGTH information indicated by the control information L-SIG, and
in a case where a transmission mode indicated by the control information HT-SIG is not supported, only when the LENGTH information indicated by the control information L-SIG is a value dividable by 3, the measuring includes estimating the sending end time of the reception packets by using the RATE information and the LENGTH information indicated by the control information L-SIG.

11. A non-transitory computer-readable storage medium having a computer-readable program stored therein that when executed by a computer cause the computer to perform a method, the method comprising:
receiving packets in multiple formats in which two or more different types of preamble information and intra-header control information are multiplexed;
demodulating and decoding the received packets when the received packets are transmitted via a predetermined transmission mode;
and
measuring a sending end time of the reception packets by selectively referring to any one of the intra-header control information when the packets are transmitted via the predetermined transmission mode supported by the demodulating and decoding, wherein
the packets in the multiple formats are Mixed Format (MF) packets in which control information L-SIG compatible to IEEE 802.11a and control information HT-SIG not compatible to IEEE 802.11a which are specified by IEEE 802.11n are multiplexed,
in a case where a transmission mode indicated by the control information HT-SIG is not supported by the demodulating and decoding, the measuring includes measuring the sending end time of the reception packets by using RATE information and LENGTH information indicated by the control information L-SIG, and
in a case where a transmission mode indicated by the control information HT-SIG is not supported by the demodulating and decoding, only when the LENGTH information indicated by the control information L-SIG is a value dividable by 3, the measuring includes estimating the sending end time of the reception packets by using the RATE information and the LENGTH information indicated by the control information L-SIG.

* * * * *